United States Patent
Bellows

(10) Patent No.: US 7,206,284 B2
(45) Date of Patent: Apr. 17, 2007

(54) METHOD AND APPARATUS FOR AUTOMATIC CONGESTION AVOIDANCE FOR DIFFERENTIATED SERVICE FLOWS

(75) Inventor: Mark David Bellows, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1051 days.

(21) Appl. No.: 10/305,745

(22) Filed: Nov. 27, 2002

(65) Prior Publication Data

US 2004/0100901 A1 May 27, 2004

(51) Int. Cl.
*G01R 31/08* (2006.01)
*H04L 12/28* (2006.01)
*H04J 3/16* (2006.01)

(52) U.S. Cl. .............. 370/230.1; 370/412; 370/465; 370/235

(58) Field of Classification Search ........ 370/229–231, 370/235, 465, 412
See application file for complete search history.

(56) References Cited

U.S. PATENT DOCUMENTS

| 6,870,811 | B2* | 3/2005 | Barker et al. ............... 370/235 |
| 6,987,732 | B2* | 1/2006 | Gracon et al. ........... 370/235.1 |
| 2002/0012348 | A1* | 1/2002 | Mizuhara et al. ........... 370/392 |
| 2003/0223366 | A1* | 12/2003 | Jeffries et al. ............ 370/231 |
| 2003/0223368 | A1* | 12/2003 | Allen et al. ................ 370/235 |

* cited by examiner

*Primary Examiner*—Huy D. Vu
*Assistant Examiner*—Nittaya Juntima
(74) *Attorney, Agent, or Firm*—Joan Pennington

(57) ABSTRACT

A method and apparatus are provided for implementing automatic congestion avoidance for differentiated service flows in a communications network. A bandwidth control signal representing congestion information is identified. Responsive to the identified bandwidth control signal, dual transmit probabilities are calculated for each flow. The dual transmit probabilities include a first transmit probability for a first color and a first transmit probability for a second color. A marked color for a packet is identified. The marked packet color and the calculated dual transmit probabilities are selectively utilized for making a packet discard determination.

19 Claims, 7 Drawing Sheets

METHOD AND APPARATUS FOR AUTOMATIC CONGESTION AVOIDANCE FOR DIFFERENTIATED SERVICE FLOWS

FIELD OF THE INVENTION

The present invention relates generally to the data processing field, and more particularly, relates to a method and apparatus for implementing automatic congestion avoidance for differentiated service flows over a communications network.

DESCRIPTION OF THE RELATED ART

With Internet Protocol (IP), communication between network devices is accomplished with packets. Each packet can contain various messages with varying widths. Because not all packets have the same priority, the Internet standards committee has proposed a method to differentiate packets by using 6 bits in the header of an Internet packet. This is known as Differential Services or DiffServ. In order to make a differentiated service work, a routing device must read these header bits and provide a method of dealing with high priority traffic in a different manner than low priority traffic.

Also, the Internet task force has defined a standard for monitoring and policing incoming traffic. This is accomplished by using two methods of policing, Single Rate Two Color Marking and Two Rate Two Color Marking, RFC2698/RFC2697. In either method, an incoming packet is checked against the history of packets on the same flow. If an incoming flow exceeds certain defined bounds, the packet is marked yellow. If a packet exceeds an upper limit, the packet is marked red. If no bounds are exceeded, the color is green. The colors green, yellow or red can be sent to the next hop along with the packet to aid in the next hops decision to pass the packet along or to discard it.

If there is sufficient bandwidth in a router, there is no reason to discard yellow or red packets. However, if the router experiences congestion, then the packets of color red and yellow should be the first ones to be discarded. The Request for Comment (RFC 2698/RFC 2697) specifies that the drop rate for red should be greater than or equal to the drop rate for yellow which should be greater than or equal to the drop rate for green.

Differentiated Services attempts to classify incoming Internet packets into flows and when a router experiences congestion, different probabilities for discarding red and yellow packets from each flow are needed. How to calculate the drop probabilities and keep them in synchronization with the system has been a manual trial and error process.

Various methods have been proposed over the years to randomly drop packets according to some drop probabilities. One method still in use today is known as Random Early Discard (RED). By setting system parameters that must be set before congestion occurs, a drop probability can be created. Another commonly used and improved method is known as Weighted Random Early Discard. The Weighted Random Early Discard method attempts to provide some improvements over RED by allowing some lines or paths higher priority without dropping packets from multiple sources. Again, a manual approach is used in setting up the system to handle the drop probabilities. Both methods employ threshold monitoring and then a drop rate supplied by the system administrators are applied. However, neither method takes in account the Differentiated Service information. Neither method is dynamic, that is, these methods do not provide discard rates based on the system utilization.

International Business Machines Corporation of Armonk, N.Y. has developed a more recent method called Bandwidth Allocation Technology. The Bandwidth Allocation Technology (BAT) method provides an automatic system to deal with allocating the bandwidth resources of a chip or system based upon the system utilization. The BAT method applies control theory to create an automatic system that reacts to congestion.

In the BAT method, the transmit ratio Ti for a given flow can be determined by the following equations:

if $fi <= mini$ then $Ti(t+Dt) = min(1, Ti(t) + 0.125)$ else if $(fi > maxi)$ then $Ti(t+Dt) = 0.857 * Ti(t)$ else if $B=1$ $Ti(t+Dt) = min(1, Ti(t) + Ci*E(t))$ else $Ti(t+Dt) = max(0, Ti(t) - Di*fi(t))$ The value fi represents the amount of bytes transmitted for any given line or channel i input to a network router. Ti is the transmit probability for any given input i. Ti(t+Dt) represents the transmit rate for a next period that starts after the computation is performed. Ti(t) represents the previous transmission rate, for what was just being transmitted. The transmit probability Ti is a value between 0 and 1. Mini represents a lower limit or guaranteed level where the transmit probability Ti will not be reduced. The bytes transmitted over a sample time value fi is compared with the mini value to determine whether the flow is below the lower limit or guaranteed level.

Maxi represents an upper limit or a maximum number of bytes that the channel can transmit. The bytes transmitted over a sample time value fi is compared with the maxi value to determine whether the flow is above the upper limit or maximum level. If a channel exceeds this number, then the transmit rate for the channel is decreased.

B represents a control signal for excess bandwidth. If the routing device is not seeing congestion, then value B is set to true or one. Packets are allowed to flow in and out without any packets being dropped. However, when congestion is detected, then the value B is set to zero.

Ci represents a constant of increase and is used when an input flow is between minimum and maximum and there is no congestion. Ci is used to allow additional packets into the system. The value E represents a history of excess bandwidth and is a value between 0 and 1. If the router is congested for only a short period of time, E will be close to one. However, if congestion has occurred over a long period of time, E will be near or at zero.

Di represents a discard coefficient or constant of decrease and is used to decrease the amount of packets entering the system during congestion. The value Dt is a complex number taking bytes into a percentage of bandwidth used for a given flow. The discard coefficient Di has a wide range of values containing a scaling value and an exponential value. The multiply of $Di*Fi(t)$ requires a large number of bits and the complexity of an exponent requiring floating point and exponent capabilities.

The equations have two functions, the first two lines monitor the rate in which frames come in and classify a packet or flow as below minimum, above minimum or between the two. The lines act as policers.

In the equations, the third line "else" is related to congestion avoidance. The final else clause begins with the line "if B=1" is defined as excess bandwidth, or in other words, the router is not experiencing congestion. The transmit probability if B=1 is min(1,Ti(t)+Ci*E(t)). This means a product of the linear increase constant Ci times a value of excess bandwidth over time E(t) is added to the current transmit probability Ti(t).

The final line begins when B=0, the transmit rate is max(0,Ti(t)−Di*fi(t)), meaning the transmit rate is the current rate minus the constant Di*fi where fi is the amount of bytes transmitted.

As shown in FIG. 3, the prior art BAT method has the following characteristics. When congestion occurs, the flow will see a reduction in its transmit probability Ti. When congestion is over, the transmit rate rises back to 100% when no further congestion is encountered. While the BAT method provides improvements over other arrangements, the BAT method has not been used for implementing automatic congestion avoidance for differentiated service flows.

A need exists for an improved mechanism for implementing automatic congestion avoidance for differentiated service flows in a communications network.

SUMMARY OF THE INVENTION

A principal object of the present invention is to provide a method and apparatus for implementing automatic congestion avoidance for differentiated service flows in a communications network. Other important objects of the present invention are to provide such method and apparatus for implementing automatic congestion avoidance for differentiated service flows substantially without negative effect and that overcome many of the disadvantages of prior art arrangements.

In brief, a method and apparatus are provided for implementing automatic congestion avoidance for differentiated service flows in a communications network. A bandwidth control signal representing congestion information is identified. Responsive to the identified bandwidth control signal, dual transmit probabilities are calculated for a flow. The dual transmit probabilities include a first transmit probability for a first color and a first transmit probability for a second color. A marked color for a packet is identified. The marked packet color and the calculated dual transmit probabilities are selectively utilized for making a packet discard determination.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
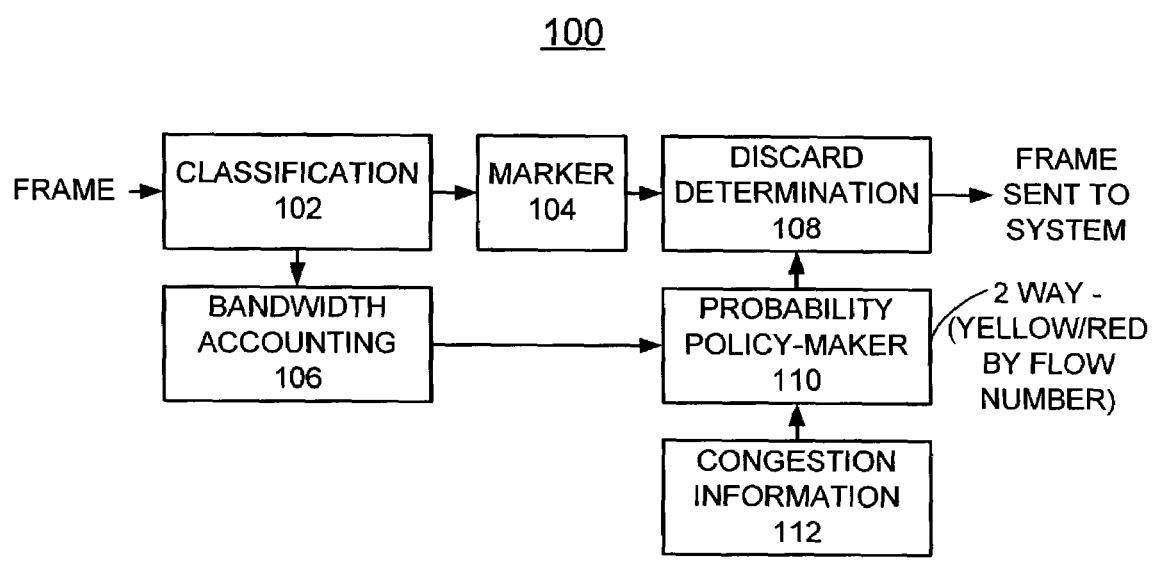
FIG. 1 is a schematic and block diagram illustrating apparatus for implementing automatic congestion avoidance for differentiated service flows in accordance with the preferred embodiment.

Having reference now to the drawings, in FIG. 1, there is shown apparatus for implementing automatic congestion avoidance for differentiated service flows in accordance with the preferred embodiment generally designated by the reference character 100. Automatic congestion avoidance apparatus includes a classification unit 102, a marker 104, a bandwidth accounting unit 106, a discard determination unit 108, a probability policy-maker 110, and congestion information 112. Each received frame or packet is classified as belonging to a stream or flow based on a subset of bits that are carried in its header by the classification mechanism 102. The marker 104 checks the incoming packet against the history of packets on the same flow. The marker 104 colors or marks the packet according to the method described in RFC 2698/RFC 2597. If an incoming flow exceeds certain defined bounds, the packet is marked yellow. If a packet exceeds an upper limit, the packet is marked red. If no bounds are exceeded, the color is green. The marker 104 applies a packet color of green, yellow or red and the flow number to the discard determination mechanism 108. The bandwidth accounting mechanism 106 only measures the input bandwidth for a flow color on a flow-by-flow basis and has only one value used to calculate fi for later calculations.

In accordance with features of the preferred embodiment, the probability policy-maker 110 applies the BAT equations twice to each flow enabling automatic congestion avoidance for differentiated service flows. BAT equations are applied once for red and then for yellow to each flow. Separate red and yellow constants, Ci and Di are set such that yellow packets decrease transmission at a rate slower than red and such that yellow packets transmission rate increases faster than red. The values of minimum and maximum are not used because in determining the color of a packet, marker 104 has determined if the packet is green, yellow or red and has marked the packet accordingly.

In accordance with features of the preferred embodiment, the probability policy maker 110 contains two sets of the constants: Ci and Di and calculates Ti for the two different colors, yellow and red for each flow. Congestion information 112 is represented by the value B in the BAT equations. Classification 102 determines the flow number and the previous color for discard determination. Discard determination unit 108 is enhanced in the preferred embodiment. Discard determination unit 108 receives two discard probabilities from the probability policy maker 120, one discard probability for yellow and one discard probability for red and uses the two discard probabilities to decide if the frame or packet is sent onto the rest of the system.

Figure 2:
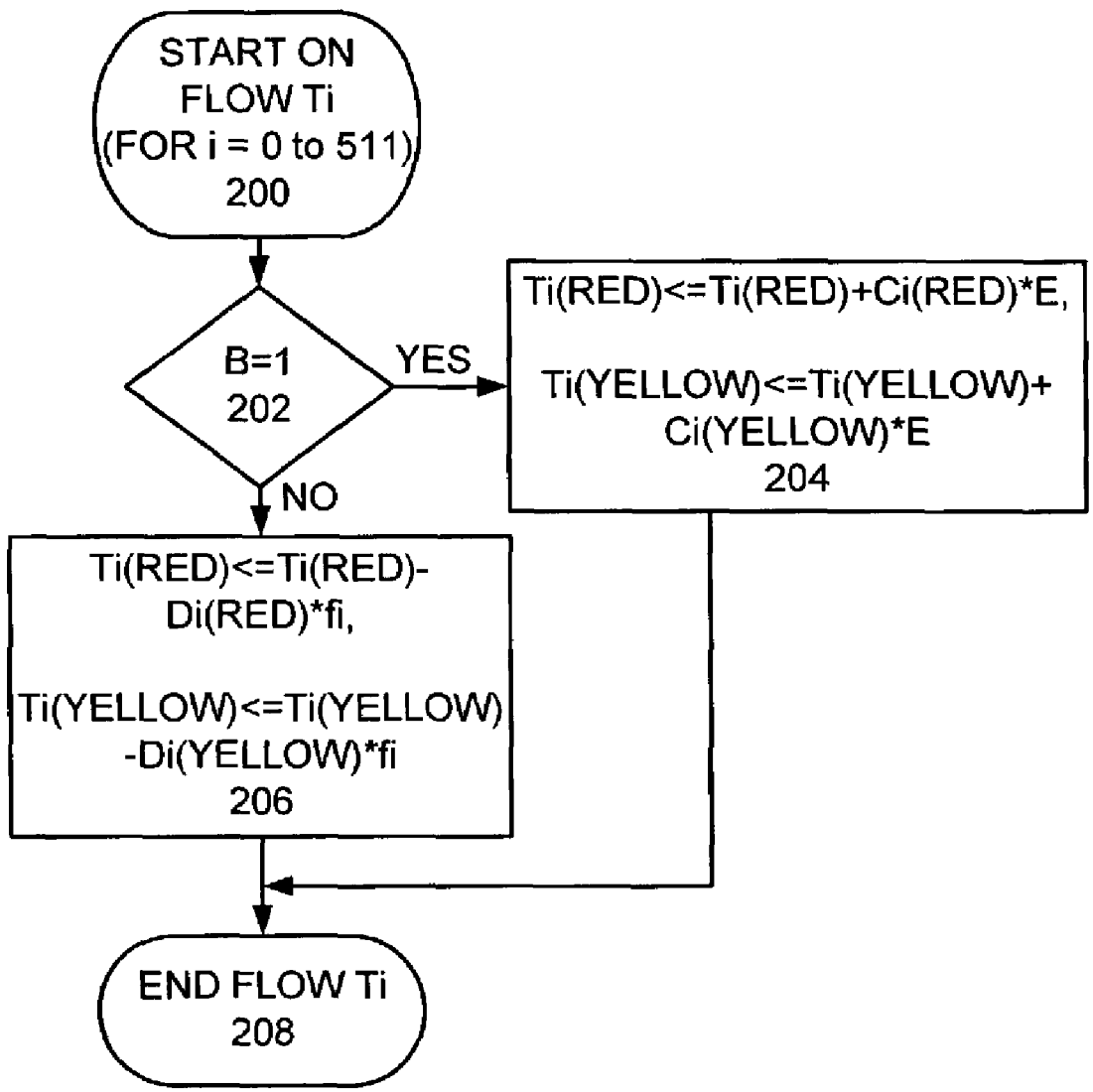
FIG. 2 is a flow diagram illustrating exemplary steps performed by a probability policy maker of FIG. 1 for implementing automatic congestion avoidance methods for differentiated service flows for bandwidth allocation technology in accordance with the preferred embodiment.
Figure 3:
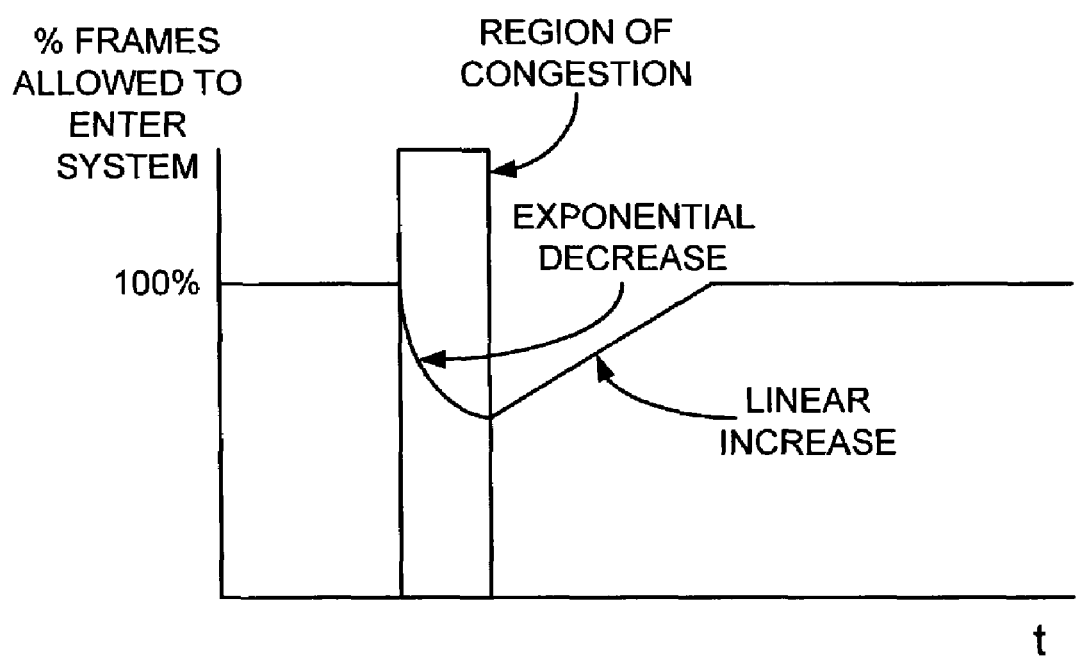
FIG. 3 is a chart illustrating system response for the prior art Bandwidth Allocation Technology (BAT) method for implementing congestion control.

Referring now to FIG. 2, there are shown exemplary steps performed by a probability policy maker 110 for implementing automatic congestion avoidance methods for differentiated service flows for bandwidth allocation technology in accordance with the preferred embodiment. The dual probability maker 110 starts with a flow Ti, for example, for i=0 to 511, applied by bandwidth accounting 106 as indicated in a block 200. The dual probability maker 110 checks whether the control signal for excess bandwidth B applied by congestion information 112 is equal to one as indicated in a decision block 202. If the routing apparatus 100 is not seeing congestion, then value B is set to true or one. Then as indicated in a block 204 the dual probability maker 110 calculates the transmit probabilities for red and yellow, Ti(red) and Ti(yellow) with B=1 represented by the following equations, where Ci(red) represents:

$$Ti(red) <= Ti(red) + Ci(red)*E$$

$$Ti(yellow) <= Ti(yellow) + Ci(yellow)*E$$

Ci(red) and Ci(yellow) respectively represent a constant of increase for red and yellow packets used when there is no congestion. Ci(red) and Ci(yellow) allows additional packets into the system. Ci(yellow) is a larger value than Ci(red) so that yellow packets return to 100% capacity faster than the red packets following a period of congestion. The value E represents a history of excess bandwidth and is a value between 0 and 1; with congestion for only a short period of time, E is close to one and when congestion has occurred over a long period of time, E is near or at zero.

Otherwise, when congestion is detected the value B is zero. Then as indicated in a block 206 the dual probability maker 110 calculates the transmit probabilities for red and yellow, Ti(red) and Ti(yellow) with B=0 represented by the following equations:

$$Ti(red) <= Ti(red) - Di(red)*fi$$

$$Ti(yellow) <= Ti(yellow) - Di(yellow)*fi$$

Di(red) and Di(yellow) respectively represent a discard coefficient or constant of decrease for red and yellow packets used to decrease the amount of packets entering the system during congestion. Di(red) is a larger value than Di(yellow) so that red packets are discarded faster than the yellow packets during a period of congestion. The value fi represents the amount of bytes transmitted for the flow. This completes the dual transmit probabilities calculations for the flow Ti of the probability policy-maker 110 as indicated in a block 208.

The Discard Determination unit 108 takes the flow number and the packet color after it has been marked by marker 104, and uses the probabilities Ti(red) or Ti(yellow) supplied by probability policy-maker 110 and decides if the packet should be discarded or not.

Figure 4:
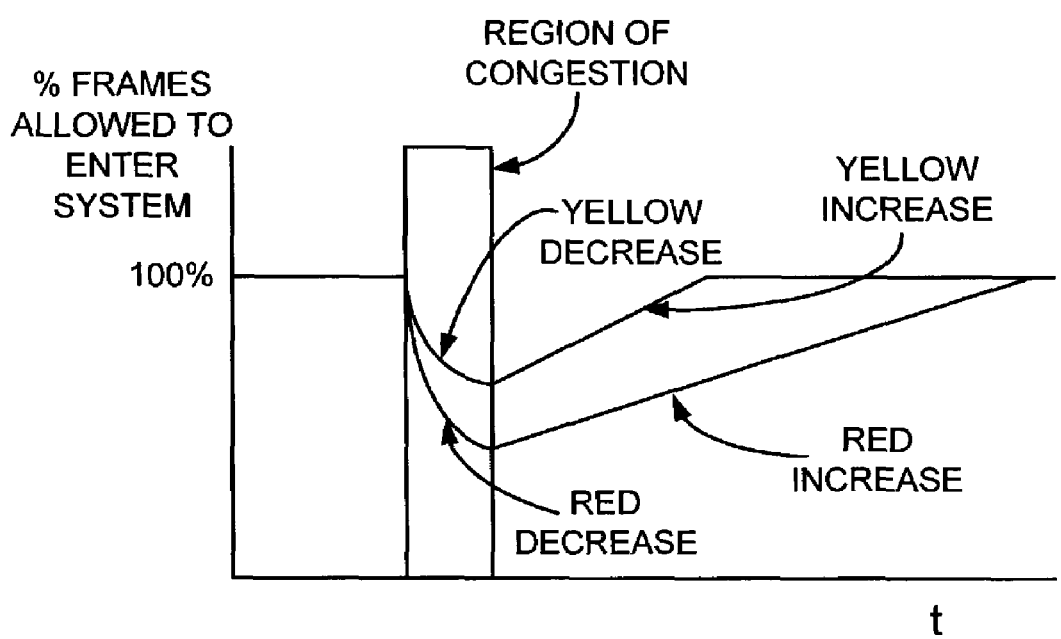
FIGS. 4, 5 and 6 are charts illustrating system response for the apparatus of FIG. 2 for implementing automatic congestion avoidance for differentiated service flows in accordance with the preferred embodiment.
Figure 5:
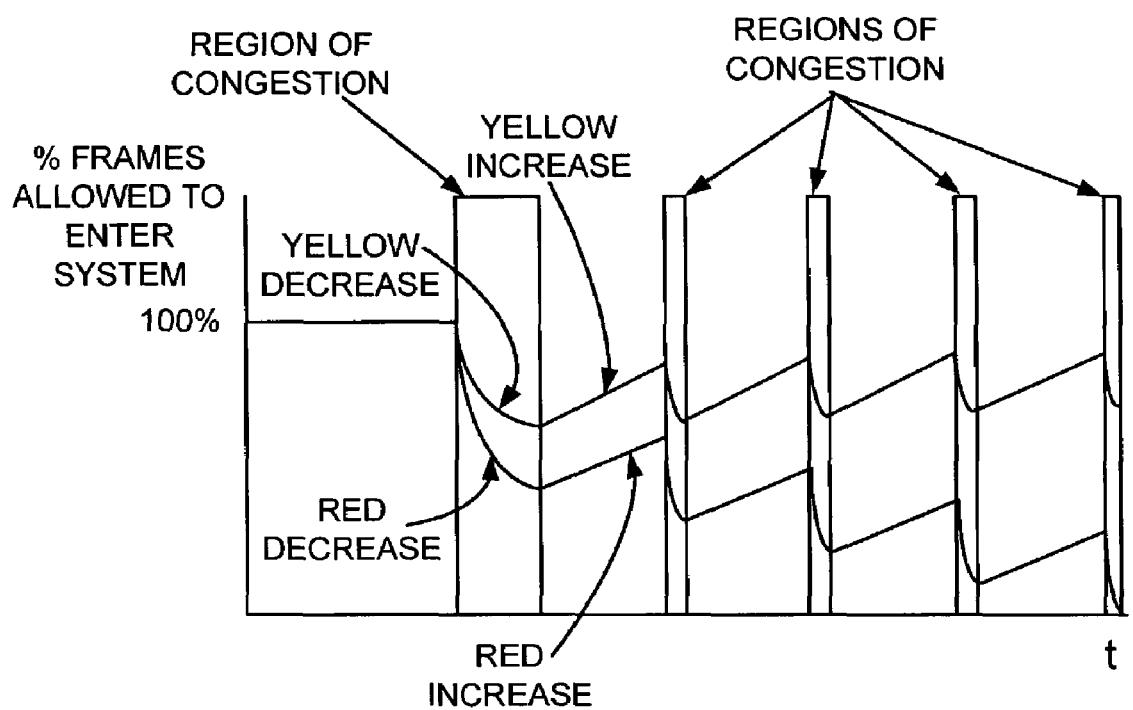
Figure 6:
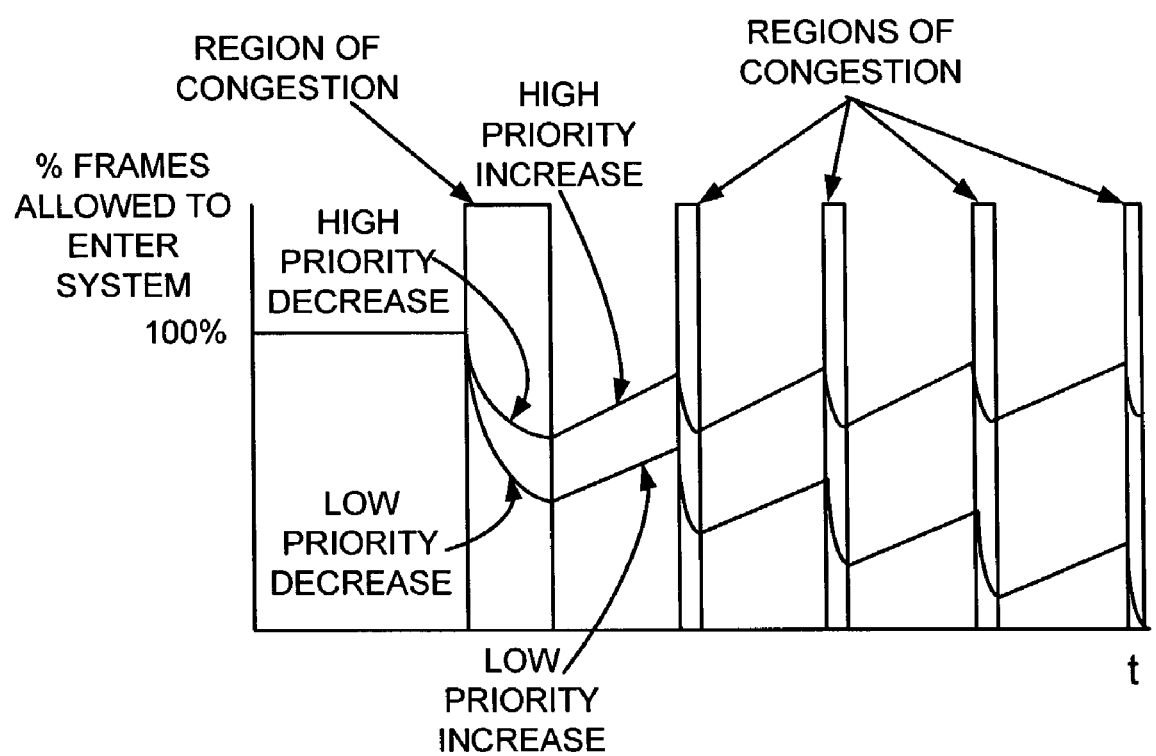

Referring to FIGS. 4, 5, and 6, there are shown exemplary system responses for the apparatus 100 for implementing automatic congestion avoidance for differentiated service flows in accordance with the preferred embodiment. As shown in FIGS. 4 and 5, packets are discarded at different rates depending on the color of the packet. This results from using the dual drop probability as described.

FIG. 4 shows the system response provided by apparatus 100 if congestion is encountered once over the period of time. When congestion is encountered, the red packets are discarded faster than the yellow packets. When the period of congestion is over, the yellow packets will return to 100% faster than the red.

FIG. 5 shows the system response provided by apparatus 100 if there is sustained congestion. As shown with the sustained congestion what will happen is the discards will occur followed by a small period of time when frames allowed to enter the system rise slightly until the congestion reoccurs. After a point the yellow frames reach an equilibrium as shown in FIG. 5. If the system is over subscribed, red frames will be dropped until the yellow frames reach equilibrium. If the system is significantly over subscribed, the yellow frames eventually reach 0% too.

FIG. 6 illustrates that packets are discarded at different rates depending on the priority of the flow. Each flow can have different probabilities. As shown, a high priority flow has a slower decrease than a low priority flow during a region of congestion. Then the high priority flow has a faster increase than a low priority flow following the region of congestion.

Figure 7:
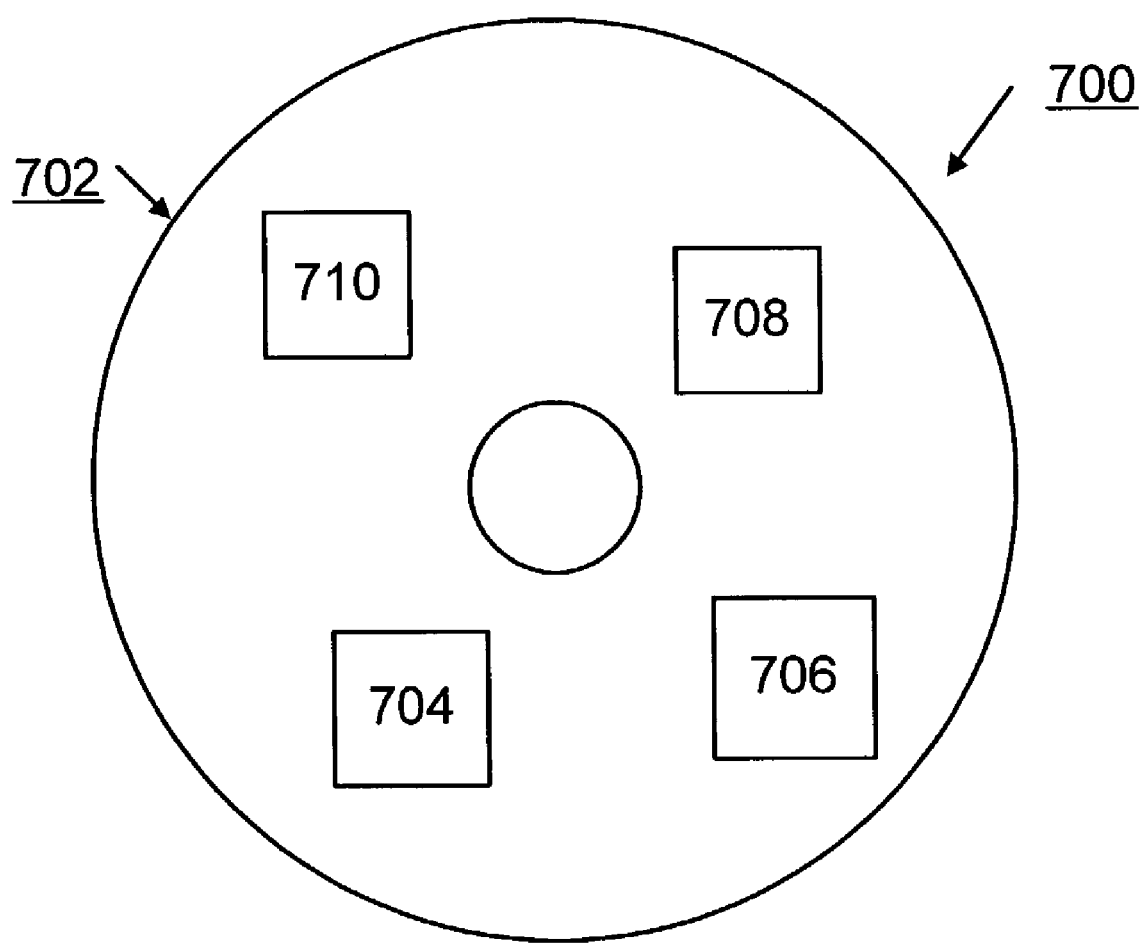
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing automatic congestion avoidance for differentiated service flows of the preferred embodiment with apparatus 100 of FIG. 1.

A sequence of program instructions or a logical assembly of one or more interrelated modules defined by the recorded program means 704, 706, 708, 710, direct the apparatus 100 for implementing automatic congestion avoidance for differentiated service flows of the preferred embodiment.

While the present invention has been described with reference to the details of the embodiments of the invention shown in the drawing, these details are not intended to limit the scope of the invention as claimed in the appended claims.

What is claimed is:

1. A method for implementing automatic congestion avoidance for differentiated service flows comprising the steps of:
    identifying a bandwidth control signal, said bandwidth control signal representing congestion information;
    responsive to said identified bandwidth control signal, calculating dual transmit probabilities for a flow; said dual transmit probabilities including a first transmit probability for a first color and a first transmit probability for a second color;
    identifying a marked color for a packet; and
    selectively utilizing said marked color for said packet and said calculated dual transmit probabilities for making a packet discard determination.

2. A method as recited in claim 1 includes the step of storing first and second constants of increase for use in the dual transmit probabilities calculation step when said bandwidth control signal indicates no congestion.

3. A method as recited in claim 2 wherein said first and said second constants of increase are represented by Ci(red) and Ci(yellow) for red and yellow packets.

4. A method as recited in claim 3 wherein the dual transmit probabilities calculation step includes the steps of calculating said first transmit probability for said first color of red represented by:

$$Ti(red) <= Ti(red) + Ci(red)*E, \text{ and}$$

calculating said second transmit probability for said second color of yellow represented by:

$$Ti(yellow) <= Ti(yellow) + Ci(yellow)*E;$$

where E represents a history of excess bandwidth and is a value between 0 and 1.

5. A method as recited in claim 3 wherein said first constant of increase Ci(red) is a smaller value than said second constant of increase Ci(yellow).

6. A method as recited in claim 1 includes the steps of storing first and second constants of decrease for use in the dual transmit probabilities calculation step when said bandwidth control signal indicates congestion.

7. A method as recited in claim 6 wherein said first and said second constants of decrease are represented by Di(red) and Di(yellow) for red and yellow packets.

8. A method as recited in claim 7 wherein said first constant of decrease Di(red) is a larger value than said second constant of decrease Di(yellow).

9. A method as recited in claim 7 wherein the dual transmit probabilities calculation step includes the steps of calculating said first transmit probability for said first color of red represented by:

$$Ti(red) <= Ti(red) - Di(red)*fi, \text{ and}$$

calculating said second transmit probability for said second color of yellow represented by:

$$Ti(yellow) <= Ti(yellow) - Di(yellow)*fi,$$

where fi represents an amount of bytes transmitted for the flow.

10. Apparatus for implementing automatic congestion avoidance for differentiated service flows comprising:
a probability policy maker receiving a bandwidth control signal and calculating dual transmit probabilities for a flow responsive to said bandwidth control signal; said dual transmit probabilities including a first transmit probability for a first color and a first transmit probability for a second color,
said probability policy maker storing first and second constants of increase for use in calculating said dual transmit probabilities when said bandwidth control signal indicates no congestion;
said probability policy maker storing first and second constants of decrease for use in calculating said dual transmit probabilities when said bandwidth control signal indicates congestion; and
a discard determination logic receiving a packet color and coupled to said probability policy maker receiving said dual transmit probabilities including said first transmit probability for said first color and said first transmit probability for said second color and making a packet discard determination.

11. Apparatus as recited in claim 10 wherein said stored first and second constants of increase are represented by Ci(red) and Ci(yellow) for red and yellow packets; and wherein said first constant of increase Ci(red) is a smaller value than said second constant of increase Ci(yellow).

12. Apparatus as recited in claim 11 wherein said probability policy maker storing first and second constants of increase for use in calculating said dual transmit probabilities when said bandwidth control signal indicates no congestion includes calculating said first transmit probability for said first color of red represented by:

$$Ti(red) <= Ti(red) + Ci(red)*E, \text{ and}$$

calculating said second transmit probability for said second color of yellow represented by:

$$Ti(yellow) <= Ti(yellow) + Ci(yellow)*E;$$

where E represents a history of excess bandwidth and is a value between 0 and 1.

13. Apparatus as recited in claim 10 wherein said first and said second constants of decrease are represented by Di(red) and Di(yellow) for red and yellow packets; and wherein said first constant of decrease Di(red) is a larger value than said second constant of decrease Di(yellow).

14. Apparatus as recited in claim 13 wherein said probability policy maker storing first and second constants of decrease for use in calculating said dual transmit probabilities when said bandwidth control signal indicates congestion includes calculating said first transmit probability for said first color of red represented by:

$$Ti(red) <= Ti(red) - Di(red)*fi, \text{ and}$$

calculating said second transmit probability for said second color of yellow represented by:

$$Ti(yellow) <= Ti(yellow) - Di(yellow)*fi,$$

where fi represents an amount of bytes transmitted for the flow.

15. A computer program product for implementing automatic congestion avoidance for differentiated service flows, said computer program product including a plurality of computer executable instructions stored on a computer readable medium, wherein said instructions, when executed by automatic congestion avoidance apparatus, cause the automatic congestion avoidance apparatus to perform the steps of:
identifying a bandwidth control signal, said bandwidth control signal representing congestion information;
responsive to said identified bandwidth control signal, calculating dual transmit probabilities for a flow; said dual transmit probabilities including a first transmit probability for a first color and a first transmit probability for a second color;
identifying a marked color for a packet; and
selectively utilizing said marked color for said packet and said calculated dual transmit probabilities for making a packet discard determination.

16. A computer program product as recited in claim 15 wherein said instructions, when executed by the automatic congestion avoidance apparatus, cause the automatic congestion avoidance apparatus to perform the steps of: storing first and second constants of increase for use in the dual transmit probabilities calculation step when said bandwidth control signal indicates no congestion.

17. A computer program product as recited in claim 16 wherein said stored first and second constants of increase are represented by Ci(red) and Ci(yellow) for red and yellow packets; and wherein said first constant of increase Ci(red) is a smaller value than said second constant of increase Ci(yellow).

18. A computer program product as recited in claim 15 wherein said instructions, when executed by the automatic congestion avoidance apparatus, cause the automatic congestion avoidance apparatus to perform the steps of: storing first and second constants of decrease for use in the dual transmit probabilities calculation step when said bandwidth control signal indicates congestion.

19. A computer program product as recited in claim 18 wherein said first and said second constants of decrease are represented by Di(red) and Di(yellow) for red and yellow packets; and wherein said first constant of decrease Di(red) is a larger value than said second constant of decrease Di(yellow).

* * * * *